United States Patent [19]

Suzuki et al.

[11] 3,725,391
[45] Apr. 3, 1973

[54] PROCESS FOR THE PREPARATION OF LACTAMS FROM CYCLOALKANONE OXIMES

[75] Inventors: Seiya Suzuki; Yasuo Mizuhata, both of Nagoya; Kunihiko Kinoshita, Aichi-ken; Takanobu Godo, Nagoya, all of Japan

[73] Assignee: Toray Industries, Inc., Tokyo, Japan

[22] Filed: Nov. 30, 1970

[21] Appl. No.: 93,870

Related U.S. Application Data

[63] Continuation-in-part of Ser. No. 809,954, March 24, 1969, abandoned.

[52] U.S. Cl..............................260/239.3 A, 23/172
[51] Int. Cl..............................................C07d 41/06
[58] Field of Search...................260/239.3 A; 23/172

[56] References Cited

UNITED STATES PATENTS

| 2,221,369 | 11/1940 | Cass................................260/239.3 A |
| 2,313,026 | 3/1943 | Schlack..........................260/239.3 A |
| 2,692,878 | 10/1954 | Kahr...............................260/239.3 A |
| 2,758,991 | 8/1956 | Kretzers et al..................260/239.3 A |
| 3,462,417 | 8/1969 | Simmrock et al...............260/239.3 A |

FOREIGN PATENTS OR APPLICATIONS

| 881,646 | 1/1943 | France............................260/239.3 A |
| 1,002,424 | 8/1965 | United Kingdom............260/239.3 A |

OTHER PUBLICATIONS

Friend "Textbook of Inorganic Chemistry" Vol. III Part I pages 69–70 (1925) (Griffin).
Friend "Textbook of Inorganic Chemistry" Vol. III Part II page 63 (1926) (Griffin).
Remy "Treatise on Inorganic Chemistry" Vol. II pages 387 and 442 (Elsevier) (1956).

*Primary Examiner*—Henry R. Jiles
*Assistant Examiner*—Robert T. Bond
*Attorney*—Sherman & Shalloway

[57] ABSTRACT

A process for the preparation of lactams from cycloalkanone oximes by neutralizing the rearrangement reaction products obtained by subjecting cycloalkanone oximes to the Beckman-rearrangement with sulfuric acid or oleum, with an oxide of magnesium or zinc to thereby separate and recover the desired lactams, wherein the formation of ammonium sulfate as a by-product can be prevented; the recovery and reuse of the neutralizing agents can be advantageously and easily performed with respect to operational steps and operational equipment; the lactams of high purity can be obtained in high yields by simple separation and recovery operations; and occurrence of disadvantageous side reactions during the rearrangement and neutralizing steps can be advantageously prevented.

6 Claims, No Drawings

PROCESS FOR THE PREPARATION OF LACTAMS FROM CYCLOALKANONE OXIMES

This application is a continuation-in-part of copending application Ser. No. 809,954, filed Mar. 24, 1969, now abandoned.

The present invention relates to an industrially advantageous cyclic process for the preparation of lactams from the corresponding cycloalkanone oximes, wherein the formation of ammonium sulfate as a by-product, which cannot be avoided in conventional methods, can be prevented; the recovery and reuse of neutralizing agents can be advantageously and easily performed with respect to not only operational steps but also operational equipment; the lactams produced are of high purity and can be obtained in high yields by simple separation and recovery operations; also occurrence of disadvantageous side reactions during the rearrangement and neutralizing steps can be advantageously prevented.

More specifically, the present invention relates to a cyclic process for the preparation of lactams from the corresponding cycloalkanone oximes by neutralizing the rearrangement reaction products obtained by subjecting cycloalkanone oximes to the Beckmann-rearrangement with sulfuric acid or oleum. Such process comprises neutralizing the rearrangement products with an oxide of a metal selected from the group consisting of magnesium and zinc to thereby separate and recover the desired lactams, subjecting the metal sulfate formed by the neutralization reaction to thermal decomposition to thereby convert it to the metal oxide, and recycling the metal oxide formed by such thermal decomposition to the neutralization step.

Prior to the development of the present invention, methods have been known of separating and collecting lactams by neutralizing rearrangement reaction products (which will be referred to hereinafter as "lactam-containing sulfuric acid solutions") obtained by subjecting cycloalkanone oximes to the Beckmann-rearrangement with various acidic reagents including sulfuric acid, oleum, Lewis acids and others. When the production of lactams useful as raw materials in the production of polyamide-type synthetic fibers, such as $\epsilon$-caprolactam, $\eta$-caprolactam and $\omega$-laurinlactam is desired, from the viewpoint of both the yield and quality of resulting lactams, sulfuric acid or oleum is industrially adopted as the rearrangement reagent.

In such case, it is customary to employ two mols of the reagent, i.e., sulfuric acid or oleum, per mol of the starting oxime so as to sufficiently perform the rearrangement reaction. Although the resulting lactam is ionized in the reaction solution as shown in the following equation, the resulting lactam is in the form of a salt-like substance.

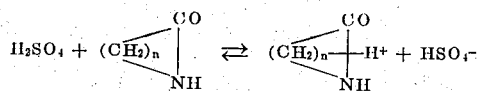

Accordingly, the neutralization of the sulfuric acid is required for separation of the desired lactam.

Prior to the development of the present invention, proposals have been made of using alkaline neutralizing agents such as ammonia, and alkali metal hydroxides and carbonates, e.g., caustic soda and sodium carbonate, in such neutralization step. For this purpose, ammonia has been industrially used to the greatest extent. In such case, the rearrangement agent is recovered in the form of ammonium sulfate. However, the amount of ammonium sulfate recovered as a by-product is as large as 1.3 to 3 tons per ton of the lactam, although the amount varies more or less depending on the class of the lactam. Accordingly, the above proposal using ammonia as the neutralizing agent involves a problem with respect to the recovery and reuse of the ammonium sulfate formed as a by-product when formed in a large amount, and the cost of the desired lactam is greatly influenced by success or failure in solving this problem.

Japanese Patent publication No. 8251/62 has proposed one solution to this problem involving a method comprising subjecting ammonium sulfate formed as the by-product to thermal decomposition to thereby convert it to ammonia and sulfur dioxide, and recovering these materials. British Patent No. 1,021,709 proposes that the neutralization can be omitted and instead the rearrangement products are subjected to extraction with a solvent, to thereby separate the desired lactams. However, each of these proposals fails to give industrially sufficient results.

For instance, in the former proposal, the recovery ratio of ammonia is low and the separation of ammonia from sulfur dioxide is difficult. Further, since the separation is conducted in two stages, complicated and expensive equipment is required. Accordingly, such method involves various industrial disadvantages.

Although the latter process is an excellent process for separating and recovering lactams from rearrangement reaction products, it involves the following new additional problems which must be solved:

A. It is difficult to condense the diluted rearrangement reagent to 100 percent concentration.

B. Phenols having a dissociation constant of $10^{-2}$ to $10^{-15}$ are proposed as the solvent capable of efficiently extracting the lactams from the acidic solution, but since these phenols accompany a portion of the sulfuric acid during the extraction, the neutralization of the lactams recovered from an extracted layer is required. When the neutralization is performed by employing, for instance, ammonia, ammonium sulfate is formed as a by-product, although the amount formed is about one-third the amount formed as the by-product in conventional methods.

C. Since the separation of the resulting lactams from the phenols is difficult and the products are poor in certain properties, it is necessary to improve the refining step.

D. Accordingly, additional expensive equipment is required in conducting such proposal industrially, and although the amount of ammonium sulfate formed as a by-product is reduced to about one-third the amount of ammonium sulfate formed as a by-product in conventional methods, the manufacturing cost of the end product is increased.

In addition, a method has been proposed in which the rearrangement reaction is carried out in the gaseous phase by employing, instead of sulfuric acid or oleum, a non-volatile, acidic substance such as phosphoric acid, silicic acid, acid sodium sulfate and acid potassium sulfate, or a solid acid catalyst such as boric acid-alumina and silica-alumina. However, in this gaseous phase method, the reaction temperature is relatively high, and, therefore, various disadvantageous side reactions, such as thermal decomposition and polymerization, often occur together with the intended rearrangement reaction, resulting in the formation of by-products in large amounts and in a decrease of the yields of lactams. Furthermore, the resulting products contain various impurities such as low boiling point materials, tarry substances and high boiling point materials. Therefore, in order to obtain lactams of high purity sufficiently usable as raw materials for synthetic nylon fibers, troublesome and disadvantageous steps are required for purification, and loss of lactams during purification is substantial.

With a view toward providing a process for the preparation of lactams without the above-described disadvantages of prior proposals, particularly a process for the preparation of lactams wherein the formation of ammonium sulfate as a by-product, which cannot be avoided in conventional methods, can be prevented; wherein the recovery and reuse of neutralizing agents can be advantageously and easily performed with respect not only to operational steps but also operational equipment wherein the desired lactams of high purity can be obtained in high yields by simple separation and recovery operations; and wherein occurrence of disadvantageous side reactions during rearrangement and neutralization steps can be advantageously prevented; considerable research was done. As a result, as has been discovered, the above objects can be achieved by conducting the neutralization of the rearrangement reaction products with the use of the oxides of magnesium and zinc.

Since alkali metal oxides react with water to render the system strongly alkaline, the yields of lactams are decreased by hydrolysis or thermal degradation of the lactams during neutralization. Furthermore, the thermal decomposition of the sulfates resulting from the neutralization is very difficult. Still further, the handling of alkali metal oxides per se is quite dangerous. Accordingly, the above objects cannot be attained by the use of alkali metal oxides.

When the oxides of tin, iron, manganese, chlorium and aluminum are used, for example, the neutralization reaction hardly advances at temperatures ranging from room temperature to 100°C. in the lactam-containing sulfuric acid solutions. Additionally, if the neutralization reaction advances within such temperature range, it is to an extremely small extent. Even when the reaction is conducted at higher temperatures, the reaction rate is very low, resulting only in the degradation of the desired lactams. Therefore, the above objects cannot be achieved by the use of oxides of metals of the above groups.

When an oxide of copper or calcium is used, such as set forth in French Patent No. 881,646, the sulfate of such metal has a relatively low solubility in water, thereby making such process industrially disadvantageous when compared to the process of the present invention.

In accordance with the present invention, an oxide of magnesium or zinc is used for the neutralization of the lactam-containing sulfuric acid solution. Since the sulfate of such metal resulting from the neutralization reaction is highly soluble in water, the separation of a crude lactam from the metal sulfate solution can be performed as easily as the separation with the use of a conventionally known alkaline neutralizing agent.

The reason for the particular use of the oxides of magnesium or zinc in the present invention is that the yield of the purified lactam and the quality characteristic value (PMV) of the purified product are far superior to those obtained with the use of CaO or CuO, for example.

Although a cause of this is not entirely clear, it is assumed that the use of MgO, ZnO, CaO, or CuO as a neutralizing agent can lead to the formation of lactams almost quantitatively, but when CaO or CuO is used, the reciprocal action of such neutralizing agent and the solvent will give rise to those impurities which cause considerable damage to the quality of the lactams obtained. When CaO is used, the solvent, whether water or benzene, forms a large mass in the neutralizing system, and the neutralization does not proceed smoothly. Furthermore, CuO has a very small neutralizing power, and, accordingly, does not smoothly effect the neutralization reaction.

For example, when utilizing such oxides of magnesium or zinc, when the rearrangement mixture is neutralized, it is divided into two layers, an upper layer containing the desired lactam and a lower layer containing the sulfate. Accordingly, separation can be performed by conventional known techniques.

Accordingly, it is a principal object of the present invention to provide a process for the production of lactams from the corresponding cycloalkanone oxime by a method which eliminates the inherent deficiencies of previous processes, particularly with respect to the elimination of the ammonium sulfate by-product.

A further object of the present invention relates to such a process wherein a cyclic system is provided in which the rearrangement reaction products are neutralized with magnesium oxide or zinc oxide.

A still further object of the present invention involves such a cyclic process wherein lactams are produced in high yield and in high quality by neutralizing the rearrangement reaction products obtained by subjecting cycloalkanone oximes to the Beckmann-rearrangement with sulfuric acid or oleum with zinc oxide or magnesium oxide, subjecting the zinc or magnesium sulfate so formed to thermal decomposition, and utilizing the zinc or magnesium oxide of the thermal decomposition in the neutralization reaction.

Still further objects and advantages of the present invention will become more apparent from the following more detailed description thereof.

The process of the present invention is broadly applicable to the preparation of lactams from cycloalkanone oximes, but it is particularly preferred to apply the process of the present invention to the separation and collection of lactams from rearrangement reaction products obtained by subjecting at least one oxime selected from cyclohexanone oxime, cyclooctanone oxime and cyclododecanone oxime to the Beckmann-rearrangement with sulfuric acid or oleum.

The Beckmann-rearrangement of oximes with sulfuric acid or oleum is well known and, accordingly, an explanation of the Beckmann-rearrangement reaction is unnecessary.

The most prominent feature of the present invention resides in the step of neutralizing the Beckmann-rearrangement reaction products with an oxide of magnesium or zinc. This neutralization step may be performed by employing a customary stirring tank provided with an agitator.

The metal oxide may be fed to rearrangement reaction products in any optional form, for instance, in an aqueous slurry, or an aqueous system containing the metal sulfate, or in a state dispersed in an organic solvent.

In order to promote the neutralization reaction, it is preferred to carry out the neutralization at about 30° to 100°C., especially 60° to 80°C., under vigorous agitation. It is advantageous to carry out the neutralization in a manner such that the pH of the crude lactam at the neutralization point will be maintained at 3 to 6, preferably at 5, during the final stage of neutralization. From the viewpoint of ease of separation and the production of a high yield of the desired lactam, it is desirable to select the amount of metal oxide fed in a manner such that the aqueous solution of the metal sulfate resulting from the neutralization will be a saturated solution or an almost saturated solution.

After completion of the neutralization, the liquid phase of the crude lactam is separated from the liquid phase of the aqueous solution of the metal sulfate, and the crude lactam is collected. The aqueous solution of the metal sulfate resulting from the neutralization is fed to a crystallizing tank where the metal sulfate is crystallized by crystallization under reduced pressure. If desired, other crystallization methods, for instance, condensation by combustion in liquid or cooling crystallization, may be adopted.

The crystallization of the metal sulfate is advantageously performed in a manner such that the metal sulfate will be crystallized in an amount corresponding to the amount of sulfuric acid contained in the lactam-containing sulfuric acid solution fed to the neutralization zone. Generally, when the metal sulfate is crystallized from its aqueous solution, it is recovered in a form having crystal water. Therefore, it is preferred to return the filtrate from which the metal sulfate has been removed to the neutralization tank after addition of an optional amount of water and mixing therewith.

The thermal decomposition of the crystallized metal sulfate is carried out by a method known per se. For instance, the metal sulfate is easily converted into the metal oxide and sulfur dioxide by mixing it with a carbon source, such as coke or charcoal, and heating the mixture at 700° to 1300°C. in a decomposition furnace. The resulting metal oxide is recycled to the neutralization step and reused. In addition, it is possible to reuse the recovered sulfur dioxide for the rearrangement step after its conversion to sulfuric acid, or to use it for other purposes.

In accordance with the present invention, it is also possible to perform the neutralization in the absence of water or in the presence of an extremely small amount of water, which the sulfate of the metal oxide used for the neutralization contains as crystal water (these two cases will be referred to sometimes as "in the substantial absence of water") by adding a dispersion of the metal oxide in an organic solvent capable of dissolving the resulting lactam, to the lactam-containing sulfuric acid solution or by adding such solution to the above dispersion. Still further, it is possible to carry out the neutralization by adding the metal oxide to the lactam-containing sulfuric acid solution in the substantial absence of water and then adding an organic solvent to the system, or by adding such organic solvent to the lactam-containing sulfuric acid solution in the substantial absence of water and then adding a powder of the metal oxide to the system.

In these embodiments employing organic solvents, since the crude lactam is extracted with an organic solvent coincidentally with neutralization, the separation of the lactam from the metal sulfate can be easily performed.

The above-described embodiments employing an organic solvent are advantageously practiced on an industrial scale, because the metal sulfate is recovered in a form of crystal and equipment for crystallizing the metal sulfate is unnecessary, resulting in simplification of operational procedures.

Any organic solvent which is inert to sulfuric acid and the zinc and magnesium oxides, and capable of dissolving lactams, can be used in the above embodiments. Accordingly, halogenated hydrocarbons, such as methylene chloride, dichloromethane, chloroform, carbon tetrachloride, freon, dichloropropane, 1,2-dichloroethane, trichloroethylene, tetrachloroethylene, 1,2,3-trichloropropane, 1,4-dichlorobutane, 1,1,1-trichloroethane; aromatic solvents and substituted aromatic solvents, such as toluene, xylene, nitrobenzene, chlorobenzene, benzene; chlorocyclohexane; cyclohexane; decaline; nitromethane; acetic acid; ethyl acetate; phenol; cyclohexanol; etc. can be advantageously utilized. These organic solvents may be used either singly or in the form of mixtures of two or more of such organic solvents. In view of their stability to sulfuric acid and their ability to dissolve lactams, halogenated hydrocarbons are most preferred.

The advantages of the process of this invention over the conventional methods are summarized by the following points:

A. In the process of the present invention, lactams can be prepared without any formation of ammonium sulfate as a by-product.

B. Lactams of high quality and in high yield can be produced from the corresponding cycloalkanone oximes. This is apparent from Table 1 below, wherein the results of examples of conventional methods and of the process of the present invention are shown.

TABLE 1

| | Conventional method | | Process of this invention |
|---|---|---|---|
| Neutralizing agent | Caustic soda | Ammonia | Zinc oxide |
| Neutralization solvent | Water | Water | Water |
| Neutralization yield of lactam (%) | 95.0 – 96.0 | 96.0 – 97.0 | 98.5 – 99.0 |

C. The process of this invention is economically advantageous when compared to conventional methods of recovering sulfuric acid in the form of ammonium sulfate.

D. As compared with conventional methods involving decomposing ammonium sulfate, in the process of the present invention, complicated, expensive equipment for decomposition is not necessary because the decomposition can be performed easily by a one-stage operation, and the metal oxides can be recovered at higher ratios. Further, the process of the present invention can be carried out industrially with ease.

The present invention will now be illustrated by the following examples, but the present invention is not in any way limited thereto.

EXAMPLE 1

A solution comprising 35 percent by weight of ε-caprolactam (hereinafter referred to simply as "lactam"), 62 percent by weight of sulfuric acid and 3% by weight of impurities was prepared by subjecting oil cyclohexanone oxime hydrochloride obtained by photonitrosation of cyclohexane, to the Beckmann-rearrangement reaction in a customary manner. Five hundred grams of the above crude lactam-containing sulfuric acid solution were mixed with 270 g of zinc oxide having a purity of 99 percent under cooling from the outside, to form a condensed slurry mixture thereof. To the condensed slurry mixture were added 610 g of water to dissolve the zinc sulfate therein. Since the excessive zinc oxide floated in the solution, filtration was conducted. The filtered zinc oxide (10 g) was returned to the neutralization system. The filtrate was heated at 90°C. and divided into an upper layer of 200 g of an oily aqueous solution comprising 72.5 percent of the lactam and 1.0 percent of zinc sulfate, and a lower layer of 1,170 g of an aqueous solution of zinc sulfate containing 2.4 percent of the lactam and 43.5 percent of zinc sulfate. The recovery ratio of the lactam at the above neutralization step was 99.0 percent. The oily aqueous solution of the lactam was forwarded to a customary step in lactam-purification, such as extraction, distillation, ion-exchange or recrystallization. On the other hand, the aqueous solution of zinc sulfate was condensed by heating to remove 200 g of water, as distilled water, and crystallized at 80°C. to separate 213 g of zinc sulfate monohydrate and 756 g of the mother liquor. The distilled water and mother liquor were returned to the neutralization step and used repeatedly. On the other hand, 213 g of the crystallized zinc sulfate monohydrate were thoroughly mixed with 15 g of coke and decomposed in a decomposition furnace maintained at 700°C. to obtain a mixed gas of steam and carbon dioxide containing 97 g of zinc oxide and 75 g of sulphurous acid gas. The recovery ratio of zinc oxide at the decomposition step was almost quantitative, and the recovery ratio of sulphurous acid gas was 96 percent. The resulting zinc oxide was recycled to the neutralization step, and the sulphurous acid gas was converted to sulfuric acid by a customary method, following which the sulfuric acid was further changed into oleum and recycled to the step of the Beckmann-rearrangement of the cyclohexanone oxime hydrochloride.

Control

For comparison, Example 1 was repeated by using other metal oxides. The results are shown in Table 2 below, together with the results of Example 1.

TABLE 2

| | Zinc oxide (ZnO) | Sodium oxide (NaO) | Iron oxide (FeO) | Tin oxide (SnO) |
|---|---|---|---|---|
| Neutralizing agent | Ex. 1 | Control | Control | Control |
| Yield of crude lactam (%) | 99.0 | 94.0 | Neutralization was impossible. | Neutralization was impossible. |
| decomposition of neutralizing agent Temperature (°C.) | 700 | 700 | | |
| Time (hour) | 1.5 | 1.5 | | |
| Recovery ratio (%) | 99.5 | 0 (no decomposition) | | |

EXAMPLE 2

A solution comprising 38 percent of a lactam, 58 percent of sulfuric acid and 4 percent of impurities was prepared by subjecting cyclohexanone oxime industrially produced from cyclohexanone and hydroxylamine sulfate, to the Beckmann-rearrangement with oleum in a customary manner. Five hundred grams of the above crude lactam-containing solution were added to 1,150 g of a 20 percent zinc sulfate aqueous solution of a slurry form containing 300 g of zinc oxide of 99 percent purity. During the neutralization step, cooling was conducted from the outside, whereby the temperature of the neutralized liquor was maintained at 45°C. The addition of the crude lactam-containing sulfuric acid solution was conducted at such a rate that the pH of the neutralized liquor was maintained above 3.

After completion of the addition, the system was mechanically stirred at 45°C. for 15 minutes, and the pH of the neutralized liquor reached 5 at the final stage. Then the liquor was subjected to the action of a centrifugal separator to separate therefrom 56 g of excessive zinc oxide floating therein. After the neutralized liquor had been allowed to stand still at 45°C., it was divided into an upper layer of 200 g of an oily aqueous solution comprising 73 percent of the lactam and 0.8 percent of zinc sulfate, and a lower layer of 1,694 g of zinc sulfate aqueous solution containing 14.5 percent of zinc sulfate and 2.5 percent of the lactam.

The recovery ratio of the lactam at the neutralization step was 99.0 percent based on the crude lactam-containing sulfuric acid solution. The oily aqueous solution of the lactam of the upper layer was transferred to the purification step, while the zinc sulfate aqueous solution of the lower layer was condensed by heating to remove 300 g of water therefrom. The condensed solution was then subjected to the crystallization at 45°C. to obtain 460 g of crystalline zinc sulfate hexahydrate and 630 g of the mother liquor. The distilled water and mother liquor were recycled to the neutralization step. The above-obtained crystalline zinc sulfate hexahydrate was dried at 300°C. to convert it to anhydrous zinc sulfate, which was then decomposed to sulphurous gas and zinc oxide in the same manner as in Example 1. The former was converted to sulfuric acid and recycled to the Beckmann-rearrangement step. The latter was recycled to the neutralization step. Thus, both were repeatedly used.

EXAMPLE 3

Five hundred grams of a crude lactam-containing sulfuric acid solution having the same composition as that of the crude lactam-containing sulfuric acid solution used in Example 1 were added to 1,100 g of water in such a manner that the temperature would not be raised up to 10°C., and 250 g of zinc oxide were added to the so-diluted solution over a period of 1.5 hours with stirring while the temperature was maintained at 10°C. by cooling. The neutralized liquor exhibited the pH of 2.0. The neutralized liquor was allowed to stand still at 10°C., whereby it was divided into an upper layer of 185 g of an oily aqueous solution comprising 73 percent of the lactam and 0.5 percent of zinc sulfate and a lower layer of 1,665 g of a zinc sulfate aqueous solution containing 30.5 percent of zinc sulfate and 2.3 percent of the lactam. The recovery ratio of the lactam at the neutralization step was 99.0 percent. The oily aqueous solution of the lactam was transported to the conventional purification step. On the other hand, the zinc sulfate aqueous solution of the lower layer was subjected to the crystallization in the same manner as in Example 1, to obtain zinc sulfate heptahydrate, which was then dried and decomposed to sulphurous gas and zinc oxide. The sulphurous gas was converted to sulfuric acid and recycled to the Beckmann-rearrangement step, while the zinc oxide was recycled to the crude lactam-neutralization step.

EXAMPLE 4

Five hundred grams of a crude lactam-containing sulfuric acid solution of the same composition as in Example 1 were added to 820 g of water in such a manner that the temperature was maintained below 30°C. Some 130 g of magnesium oxide were added over a period of 2 hours to the diluted solution and neutralization was conducted. Since the generation of heat was observed during the above neutralization, cooling was conducted from the outside so as to maintain the temperature of the system below 30°C. The pH of the neutralized liquor was 8.5. The neutralized liquor was allowed to stand still at 50°C., whereby it was divided into an upper layer of 250 g of an oily solution comprising 67.0 percent of the lactam and 0.8 percent of magnesium sulfate, and a lower layer of 1,200 g of a magnesium sulfate solution containing 31.5 percent of magnesium sulfate and 0.5 percent of the lactam.

The recovery ratio of the lactam in the neutralization step was 99.0 percent. The oily aqueous solution of the lactam of the upper layer was forwarded to the subsequent purification step, while the magnesium sulfate solution of the lower layer was subjected to the crystallization to obtain 100 g of crystalline magnesium sulfate hexahydrate. Then it was dehydrated at 500°C. and carbon was added in an amount of 2.1 mols per mol of the magnesium sulfate, followed by decomposition at 1,200°C. to obtain 28.0 g of sulphurous gas and 17.5 g of magnesium oxide. The recovery ratio of both the sulphurous gas and magnesium oxide in the decomposition step was almost 100 percent.

The sulphurous gas was converted to sulfuric acid and recycled to the step of the Beckmann-rearrangement of cyclohexanone oxime, while the magnesium oxide was recycled to the neutralization step. Thus, both were repeatedly used.

EXAMPLE 5

A solution comprising 36% by weight of ε-caprolactam (referred to as "lactam" hereinafter), 60 percent of sulfuric acid and 4 percent of impurities was prepared by subjecting cyclohexanone oxime hydrochloride obtained by the photo-nitrosation of cyclohexane to the Beckmann-rearrangement reaction in a customary manner. Five hundred grams of the crude lactam-containing sulfuric acid solution were added over a period of time of 40 minutes to a suspension of 290 g of zinc oxide in 750 ml of chloroform charged in a vessel provided with a stirrer and a cooling tube. The addition rate was adjusted so as to keep chloroform in the state of boiling. After completion of the addition, the stirring was continued for 20 minutes to complete the neutralization reaction. The pH of the neutralized liquor was measured to be 5.0. The neutralized liquor was strained by filter paper. The resulting precipitate was washed three times by employing 300 ml of chloroform each time. Some 590 g of the zinc sulfate monohydrate precipitate containing 40 g of unreacted, excessive zinc oxide were obtained. On the other hand, the filtrate was mixed with the washing liquor, followed by evaporation of chloroform to obtain 181 g of crude lactam. The recovered chloroform was recycled to the neutralization step and used to produce zinc oxide in the slurry state. The crude lactam was mixed with 2 g of caustic soda and subjected to vacuum distillation at 170°C. and 17 mm Hg. As a result, 179 g of pure lactam and 2 g of the residue were obtained. The recovery ratio of the lactam through the neutralization and distillation was 96.4 percent.

Next, 590 g of zinc sulfate containing unreacted, excessive zinc oxide were dried at 300°C. and then thermally decomposed at 770°C. in the presence of 30 g of active carbon to obtain 190 g of sulfur dioxide and 285 g of zinc oxide. The recovery ratios of the sulfur dioxide and zinc oxide in the decomposition step were 97.0 percent and 98.3 percent, respectively. The sulfur dioxide was converted to oleum and recycled to the step of the Beckmann-rearrangement of cyclohexanone oxime hydrochloride, while the zinc oxide was recycled to the step of neutralizing the crude lactam-containing sulfuric acid solution. Thus, both were repeatedly used.

EXAMPLE 6

Five hundred grams of a crude lactam-containing sulfuric acid solution of the same composition as in Example 5 were added over a period of 60 minutes to a suspension of 300 g of zinc oxide in 750 ml of a 4:1 (volume ratio) mixed solvent of 1,2-dichloropropane and carbon tetrachloride charged in a vessel provided with an agitator and a cooling tube. The rate of addition of the crude lactam-containing sulfuric acid solution was adjusted so as to keep the mixed solvent in the boiling state.

After completion of the addition, the stirring was continued for 30 minutes to complete the neutralization. The neutralized liquor was subjected to the action of a centrifugal separator to separate zinc sulfate hydrate therefrom. The zinc sulfate hydrate was washed three times by employing 300 ml of the mixed solvent each time. As a result, 300 g of the solid of zinc sulfate hydrate were obtained. The solid was dried at 300°C. and decomposed at 700°C. to yield 113 g of anhydrous sulfuric acid, 106 g of sulfur dioxide and 298 g of zinc oxide. The recovery ratios of the sulfur dioxide inclusive of anhydrous sulfuric acid, and the zinc oxide in the above decomposition step were 98 percent and 99.5 percent, respectively. The sulfur dioxide containing anhydrous sulfuric acid was converted to oleum and reused for the Beckmann-rearrangement of cyclohexanone oxime hydrochloride, while the zinc oxide was recycled to the neutralization step.

The filtrate was mixed with the washing liquor, followed by evaporation of the mixed solvent to obtain 185 g of crude lactam. The crude lactam was mixed with 2 g of caustic soda and then subjected to vacuum distillation at 170°C. and 13 mm Hg to yield 179 g of pure lactam and 6 g of the residue. The recovery ratio of the lactam through the neutralization and distillation was 99.5 percent.

COMPARATIVE EXAMPLE 1

Five hundred grams of a crude lactam-containing sulfuric acid solution of the same composition as in Example 5 were added over a period of time of 60 minutes to a suspension of 260 g of copper oxide (CuO) in 500 ml of 1,1,1-trichloroethane (sold under the tradename "Chlorothen"). The rate of addition of the crude lactam-containing sulfuric acid solution was adjusted so as to keep the chlorothen in the boiling state. After completion of the addition, the stirring was continued for 30 minutes to complete the neutralization reaction.

The neutralized liquor was subjected to an action of a centrifugal separator to separate granular copper sulfate hydrate therefrom, which was then washed four times by employing 300 ml of chlorothen each time. Some 560 g of copper sulfate hydrate were obtained. It was dried at 300°C., mixed with 50 g of carbon and decomposed at 680°C. to obtain 192 g of sulfur dioxide and 258 g of copper oxide. The recovery ratios of the sulfur dioxide and copper oxide were 98.0 percent and 99.2 percent, respectively. The recovered sulfur dioxide was converted to oleum and was recycled to the step of the Beckmann-rearrangement of cyclohexanone oxime hydrochloride, while the copper oxide was recycled to the neutra-lization step.

The filtrate was mixed with the washing liquor, followed by evaporation of chlorothen to obtain 183 g of crude lactam. It was mixed with 2 g of caustic soda and subjected to vacuum distillation at 170°C. and 13 mm Hg to obtain 179 g of pure lactam and 3 g of the residue. The recovery ratio of the lactam through the neutralization and distillation was 93.8 percent.

COMPARATIVE EXAMPLE 2

Five hundred grams of a crude lactam-containing sulfuric acid solution of the same composition as in Example 5 were added over a period of time of 60 minutes to a suspension of 250 g of copper oxide in 600 ml of trichloroethylene charged in a vessel provided with a stirrer and a cooling tube. The rate of the addition of the crude lactam-containing sulfuric acid solution was adjusted so as to maintain the temperature of trichloroethylene below 30°C. together with cooling from the outside. After completion of the addition, agitation was continued for 30 minutes at 30°C. to complete the neutralization reaction. The neutralized liquor was subjected to an action of a centrifugal separator to separate powdery copper sulfate hydrate, which was then washed three times by employing 300 ml of trichloroethylene each time. Some 550 g of copper sulfate hydrate were obtained. The hydrate was dehydrated and dried at 270°C., mixed with 20 g of coke and thermally decomposed at 700°C. to obtain 190 g of sulfur dioxide and 245 g of copper oxide. The recovery ratios of the sulfur dioxide and copper oxide at the decomposition stp were 97.0 percent and 98 percent, respectively. The recovered sulfur dioxide was converted to oleum and recycled to the step of the Beckmann-rearrangement of cyclohexanone oxime, while the copper oxide was recycled to the neutralization step. Thus, both were repeatedly used.

The filtrate was mixed with the washing liquor, followed by evaporation of trichloroethylene to obtain 185 g of crude lactam. The crude lactam was mixed with 2 g of caustic soda and subjected to vacuum distillation at 170°C. and 13 mm Hg to obtain 179 g of pure lactam and 5 g of the residue. The recovery ratio of the lactam through the neutralization and distillation was 93.2 percent.

EXAMPLE 7

A solution comprising 35 percent of $\epsilon$-caprolactam (referred to as "lactam" hereinbelow), 63 percent of sulfuric acid and 2 percent of impurities was prepared by subjecting cyclohexanone oxime obtained by the reaction between cyclohexane and hydroxylamine sulfate, to the Beckmann-rearrangement in a customary manner. Five hundred grams of the crude lactam-containing sulfuric acid solution were added at 78°C. over a period of 90 minutes to a suspension of 130 g of magnesium oxide in 1,000 ml of an azeotropic mixture of benzene and cyclohexane (weight ratio = 49.7:50.3) charged in a vessel provided with an agitator and a cooling tube. After completion of the addition, the stirring was continued at 60°C. for 60 minutes. The neutralized liquor was subjected to an action of a centrifugal separator to separate granular magnesium sulfate hydrate therefrom. The separated hydrate was washed five times by employing 300 ml of the azeotropic mixed solvent each time. As a result, 450 g of magnesium sulfate hydrate were obtained. Then it was dehydrated and dried at 500°C., mixed with 20 g of charcoal and thermally decomposed at 1,200°C. to obtain 195 g of sulfur dioxide and 128 g of magnesium oxide. The recovery ratios of the sulfur dioxide and magnesium oxide at the decomposition step were 95 percent and 98.5 percent, respectively. The recovered sulfur dioxide was converted to oleum and recycled to the step of the Beckmann-rearrangement of cyclohexanone oxime, while the magnesium oxide was recycled to the neutralization step. Thus, both were repeatedly used.

The filtrate was mixed with the washing liquor, followed by evaporation of the mixed solvent to obtain 180 g of crude lactam. The crude lactam was mixed with 2 g of caustic soda and subjected to vacuum distillation at 170°C. and 13 mm Hg to obtain 173 g of pure lactam and 9 g of the residue. The recovery ratio of the lactam through the neutralization and distillation was 97.2 percent.

COMPARATIVE EXAMPLE 3

Five hundred grams of a crude lactam-containing sulfuric acid solution of the same composition as in Example 5 were added over a period of time of 30 minutes to a suspension of 173 g of calcium oxide in 900 ml of benzene charged in a reactor provided with an agitator and a cooling tube. The rate of the addition of the crude lactam-containing sulfuric acid solution was adjusted so as to keep benzene in the boiling state. After completion of the addition, the heating was conducted for 30 minutes while keeping benzene in the boiling state. The neutralized liquor was cooled to 30°C. and then filtered. The precipitate containing calcium sulfate was washed four times by employing 300 ml of benzene each time. The filtrate and the benzene used for washing were subjected to distillation to recover 178 g of crude lactam. The recovery ratio of the lactam was 99.0 percent.

The filtered calcium sulfate hydrate was dried at 200°C. and thermally decomposed at 1,700°C. for two hours in the presence of 75 g of coke in a decomposition furnace. As a result, 170 g of calcium oxide and 191 g of sulfur dioxide were obtained. The recovery ratios of the calcium ionide and sulfur dioxide were 98.3 percent and 97.5 percent, respectively.

The recovered calcium oxide was reused for the neutralization of the crude lactam-containing sulfuric acid solution, while the sulfur dioxide was converted to sulfuric acid and reused for the Beckmann-rearrangement of cyclohexanone oxime.

The following Table 3 tabulates data from Examples 1, 4, 5 and 7 and comparative Examples 1, 2 and 3, illustrating wherein the use of ZnO and MgO provides superior yield of the purified product and superior quality characteristic values (PMV) when compared, for example, with the use of CaO or CuO.

ing of cyclohexanone oxime, cyclooctanone oxime and cyclododecanone oxime by neutralizing a rearrangement reaction product obtained by subjecting said cycloalkanone oxime to the Beckmann-rearrangement with sulfuric acid or oleum to thereby separate and recover said lactam, the improvement which comprises neutralizing said rearrangement product with an oxide of a metal selected from the group consisting of magnesium and zinc to thereby separate and recover said lactam, subjecting the metal sulfate formed by the neutralization reaction to thermal decomposition to thereby convert said metal sulfate to the metal oxide, and recycling said metal oxide formed by said thermal decomposition to the neutralization step.

2. The process of claim 1, wherein the neutralization is conducted in an organic solvent capable of dissolving the rearrangement reaction products therein in the presence of water in an amount not exceeding the amount of crystal water to be contained in the metal oxide.

3. The process of claim 1, wherein the neutralization is conducted at temperatures ranging from 30° to 100°C.

4. The process of claim 2, wherein the organic solvent is a halogenated hydrocarbon.

5. The process of claim 1, wherein neutralization is allowed to advance until the separated lactam exhibits a pH of 3 to 6.

6. The process of claim 1, wherein the thermal

TABLE 3

|  | Comparison | Comparative Examples | | | Examples | | | |
| --- | --- | --- | --- | --- | --- | --- | --- | --- |
| Run No | Comparison 3 | 1 | 2 | 1 | 4 | 5 | 7 |
| Neutralizing agent | CaO | CaO | CuO | CuO | ZnO | MgO | ZnO | MgO |
| Neutralizing solvent | Water | Benzene | 1,1,1-trichloroethane | Trichloroethylene | Water | Water | Chloroform | (d) |
| Yield (percent) of lactam in neutralization [a] | 94.0 | 95.0 | 99.5 | 99.5 | 99.5 | 99.0 | 99.5 | 98.5 |
| Purification step: | | | | | | | | |
| Extraction [b] | Yes | No | No | No | Yes | Yes | No | Ni |
| Distillation | The solvent was removed from the extract, and on addition of 1% based on the crude lactam, of sodium hydroxide, vacuum-distilled at 120° C. and 10 mm. Hg. | | | | | | | |
| Ion-exchange | Thirty parts by weight of water were added to 70 parts by weight of distilled lactam, and the mixture was passed through 10 ml. of ion-exchange resin ("Amberlite 1R-120 H-Type") at 30° C. | | | | | | | |
| Distillation | The ion-exchange treated liquor was dehydrated at reduced pressure, and on addition of 0.8%, based on crude lactam, of sodium hydroxide, was vacuum-distilled at 120° C. and 10 mm. Hg. | | | | | | | |
| Yield (percent) of purified lactam | 92.9 | 94.7 | 93.8 | 93.2 | 96.5 | 97.5 | 95.4 | 97.2 |
| PMC (sec.) of purified lactam [c] | 3,300 | 2,900 | 1,500 | 1,300 | 4,900 | 5,100 | 4,500 | 4,800 |

[a] The Beckmann-rearrangement reaction liquor of Example 1 was used.
[b] A mixture of 20 parts by weight of water and 80 parts by weight of crude lactam obtained by neutralization was extracted three times with benzene.
[c] PMC is measured as follows: One mol of N/100-KMnO₄ solution is added to a 1% aqueous solution of lactam (100 mols) and the time length until the same color as the separately prepared standard solution has appeared is expressed in seconds.
[d] Azeotropic mixture of benzene and cyclohexane.

What we claim is:

1. In a process for the preparation of a lactam from a cycloalkanone oxime selected from the group consisting decomposition of said metal sulfate is conducted by heating said metal sulfate at a temperature of from 700° to 1,300°C. in the presence of a source of carbon.

* * * * *